(12) United States Patent
Mc Kenna (10) Patent No.: US 7,159,878 B1
(45) Date of Patent: Jan. 9, 2007

(54) MOBILE BACK-PACK

(76) Inventor: Matthew M. Mc Kenna, 599 W. Saddle River Rd., Ho-Ho-Kus, NJ (US) 07423

( * ) Notice: Subject to any disclaimer, the term of this patent is extended or adjusted under 35 U.S.C. 154(b) by 229 days.

(21) Appl. No.: 10/652,525

(22) Filed: Aug. 29, 2003

(51) Int. Cl.
*B62B 1/10* (2006.01)

(52) U.S. Cl. ............ 280/78; 280/652; 280/47.26

(58) Field of Classification Search ........... 280/30, 280/78, 205–208, 652, 653, 655, 47.3, 47.31, 280/645, 47.17, 47.18, 656, 47.26; 224/15
See application file for complete search history.

(56) References Cited

U.S. PATENT DOCUMENTS

| | | | | |
|---|---|---|---|---|
| 1,742,137 A | * | 12/1929 | De Grasse | 280/37 |
| 2,465,112 A | * | 3/1949 | Murphey | 280/653 |
| 3,062,560 A | * | 11/1962 | Dunstan | 280/208 |
| 3,236,537 A | * | 2/1966 | Eckman | 280/47.18 |
| 3,301,358 A | * | 1/1967 | Rubens | 190/20 |
| 3,550,997 A | * | 12/1970 | Strand | 280/30 |
| 4,057,262 A | * | 11/1977 | Boon | 280/78 |
| 4,160,495 A | * | 7/1979 | Conard | 190/18 A |
| 4,171,139 A | * | 10/1979 | Cockram | 280/652 |
| 4,213,276 A | * | 7/1980 | Jennings | 451/344 |
| 5,284,280 A | * | 2/1994 | Stonebraker et al. | 224/153 |
| 5,564,720 A | * | 10/1996 | Stringer | 280/30 |
| 5,673,928 A | * | 10/1997 | Jury | 280/645 |
| 5,862,967 A | * | 1/1999 | Johnson | 224/577 |
| 6,073,822 A | * | 6/2000 | Swensen de Vidals | 224/629 |
| 6,142,491 A | * | 11/2000 | Darling, III | 280/30 |
| 6,626,453 B1 | * | 9/2003 | Theus et al. | 280/652 |

* cited by examiner

*Primary Examiner*—Christopher P. Ellis
*Assistant Examiner*—Bridget Avery
(74) *Attorney, Agent, or Firm*—W. Patrick Quast (57) ABSTRACT

A mobile back-pack for sports or military use is disclosed. A back-pack is devised in the form of a cabinet having the shape of a trapezoid, the cabinet being rotatably secured to a disc. The disc is dimensioned so as to permit an operator to grasp a handgrip railing at the top of the cabinet and then propel the disc at the operator's side. The cabinet glides smoothly within the circumference of the disc, riding on a peripherally positioned track within the disc. A battery powered motor and drive wheel propelled version of the mobile back-pack is also disclosed. Built-in support legs provide stability for the mobile back-pack in an upright, stationary position. Door latch secured trays within the cabinet provide for storing items to be transported, and for easy access to the items when needed.

16 Claims, 14 Drawing Sheets

MOBILE BACK-PACK

This invention relates to carrying loads by a person, which normally requires a back-pack secured to the person, in a mobile back-pack affixed to a circular disc adjacent his or her left or right side, the disc and back-pack combination then being directed or propelled by, and moving along with, the person.

BACKGROUND

The term "back-pack" refers to a ubiquitous variety of containers for personal items often arranged to be transported on the back of an individual. While the mobile back-pack of the present invention can be utilized by sportsmen, hunters, and the like, it is particularly addressed to the strenuous requirements of the military. Typically the soldier in the field is required to use a back-pack to transport large quantities of heavy, burdensome items including rifles, ammunition, hand grenades, a water supply, gas masks, communication equipment, and the like. One cannot observe a troop of soldiers moving out on a mission without being aware of the difficulty involved in the transporting of required military gear.

While troop transport requirements are obviously given careful consideration by the military, it is the purpose of the present invention to add significant new conveniences and unique new functions to the traditional military back-pack, which will be more fully discussed below.

Therefore it is the primary object of the present invention to provide a burden-reducing mobile back-pack for military personnel.

An additional object of the invention is to provide for rapid retrieval of items stored in the mobile back-pack.

Still another object of the invention is to provide a buoyant, mobile back-pack when fording streams or rivers.

A further object of the invention is to provide a protective shield for military personnel.

Yet another object of the invention is to provide a convenient communication center for the individual soldier.

SUMMARY

These and other objects are obtained with the present invention of a mobile back-pack, and method for transporting personal items.

As noted above, the standard military procedure of equipping individual troops with heavy, cumbersome back-packs at a minimum clearly reduces mobility, and can be a contributing cause to serious negative consequences under unique battlefield conditions. It occurred that relieving the soldier of this burden would significantly aid mobility, maneuverability, and speed. To this end a mobile back-pack has been devised comprising a back-pack which is rotatably connected to a larger in diameter disc. A handgrip railing on a top surface of the back-pack enables the soldier to then propel the disc in any required direction. Alternatively, the mobile back-pack can be motor driven. In either case the soldier is now free of the normally burdensome back-pack.

In one version of the invention a mobile back-pack has been devised as being a container in the form of a cabinet in the shape of a trapezoid, the cabinet being rotatably affixed to a disc. The cabinet has a substantially flat top, bottom, rear wall, and left and right sides, being dimensioned so as to just fit within an inner circumference of the disc. A guide rail extending laterally from the outer edge of the disc guides a pair of wheels affixed to the left and right sides of the bottom portion of the cabinet. A rotary fitting at the center of the disc connects the disc and mid section of the rear wall of the cabinet together, and this rotary connection, together with the disc guide rail guiding left and right mounted wheels at the base of the cabinet, provide the means for rolling the cabinet conveniently at the side of the user.

A handgrip railing is provided which extends a spaced distance along the length of the outer edge of the top surface of the cabinet. The main purpose of this handgrip railing is to provide for propelling the mobile back-pack in this manually operated version of the invention. The handgrip railing is also useful for lifting, turning, or otherwise positioning the mobile back-pack as circumstances may require.

In this manually propelled embodiment of the present invention three trays are provided for storing the myriad requirements of the user. The trays are positioned one above the other, which each tray extending substantially the width and length of the cabinet at the position in which the tray is located. A left and right side hinged front panel, split down the middle so as to open left and right by means of releasing a latch when it is desired to access the trays, provides the means for securing the trays during normal use of the mobile back-pack.

To add to the stability of the mobile back-pack when it is in an upright, stationary, ready-to-use position, a pair of support legs are provided, affixed at the left and right sides of the cabinet. Each support leg is comprised of a pair of tubes telescoped together and latch secured at the sides of the cabinet. When required they are latch released and extended outward and downward to solidly secure the mobile back-pack in the upright position.

Additional features of the mobile back-pack can include, for example, four 1" diameter holes placed approximately 90° apart adjacent the peripheral edge of the disc. These four holes can be used to string cords through when transporting the mobile back-pack. Additionally these four holes can be used in conjunction with four pegs to turn the mobile back-pack into a temporary ground shelter during field maneuvers or even battle conditions. Further useful structures for the mobile back-pack can include a 1½" sight hole adjacent the periphery of the disc, and four hook projections secured to the top and bottom sections of the cabinet front panel for securing straps to enable a soldier to carry the mobile back-pack in a traditional "back-pack" manner if confronted with an extremely steep terrain.

In a preferred embodiment of the present invention a battery powered motor and attached drive wheel is added to the above described structure for further ease and convenience in transporting personal military equipment. The motor can be mounted, for example, on a corner of a top surface of the back-pack, with the attached drive wheel positioned so as to make contact with the outer surface of the guide rail for guiding the wheels affixed to the left and right sides of the back-pack. The drive wheel can be of the frictional drive type with a frictional surface contacting a matching frictional surface of the guide rail for the back-pack guide wheels. Alternatively, the drive wheel can be of the gear type with teeth mating with matching teeth on the outer surface of the guide track. In this latter case the guide wheels would then be designed with matching teeth also for rotation on the guide rail. The described battery powered motor and drive wheel structures are available from numerous suppliers, and are well known to the art.

The versions of the mobile back-pack described above can be fabricated in a variety of materials, including: plastics, such as NYLON®, polypropylene, polyethylene, and so on; metals, including steel, aluminum, and so on; and wood.

Since the mobile back-pack is envisioned to be used under battle conditions a disc coating of bullet resisting materials such as KEVLAR® can be employed. Along this line of shield protection the disc can be fabricated from or coated with high technology materials including composites, and carbon "nanotechnology" coatings, or a radar avoiding "stealth" coating.

Thus it can be seen that the mobile back-pack of the present invention adds significant new conveniences and functions for individual transportation of personal items. The sportsman can accommodate a wide variety of needed items in a greatly simplified manner. In the case of the military, the soldier in the field can function with new ease, speed, and maneuverability. As noted above, the mobile back-pack can act as a shield under battle conditions, and can be converted into a temporary ground shelter. And important new military computer technology making each soldier a mini-information transmitting and receiving center can easily be incorporated in the mobile back-pack of the present invention.

DETAILED DESCRIPTION

Figure 1:
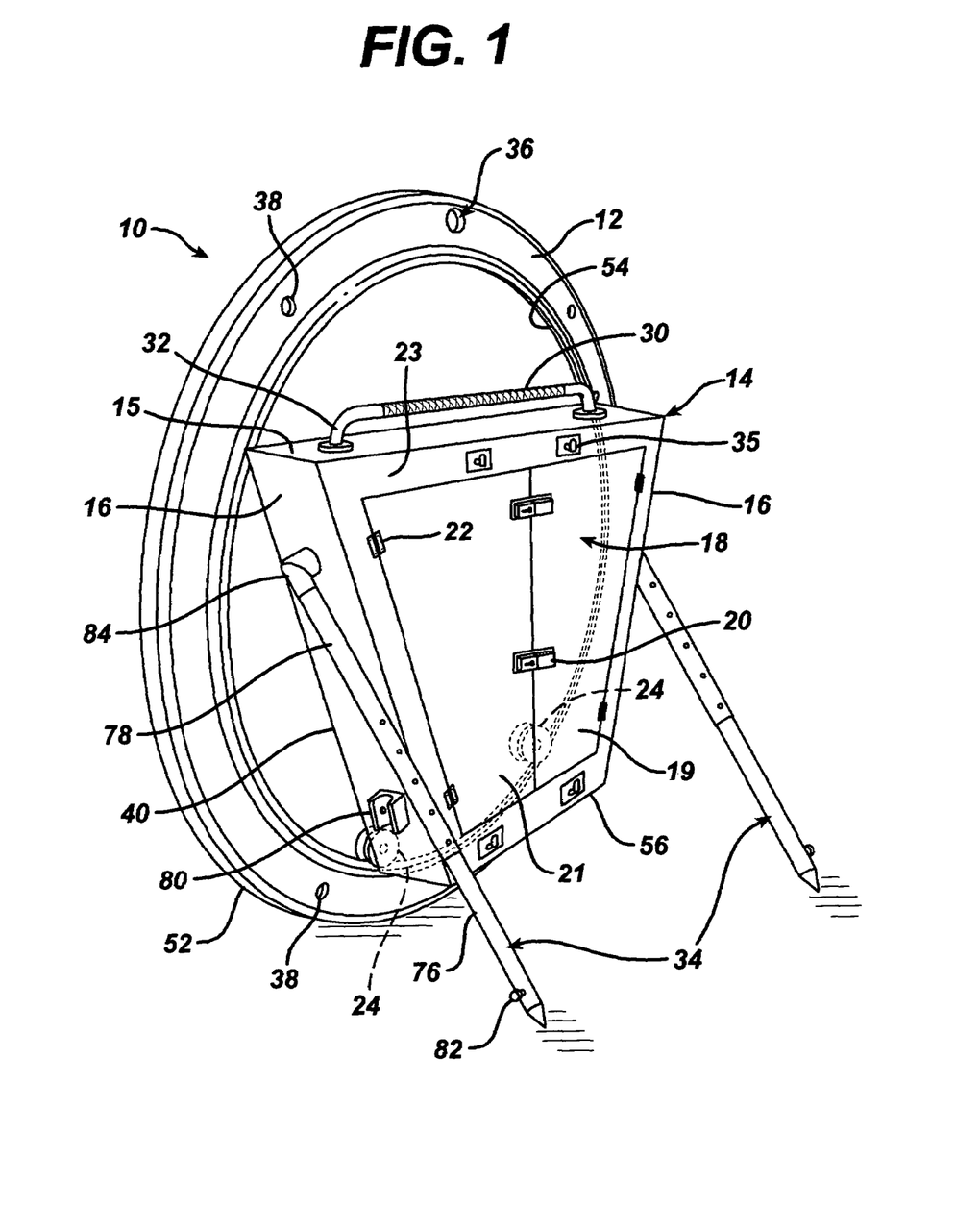
FIG. 1 is a perspective view of one version of the mobile back-pack of the present invention shown upright and stationary in a secured position.
Figure 2:
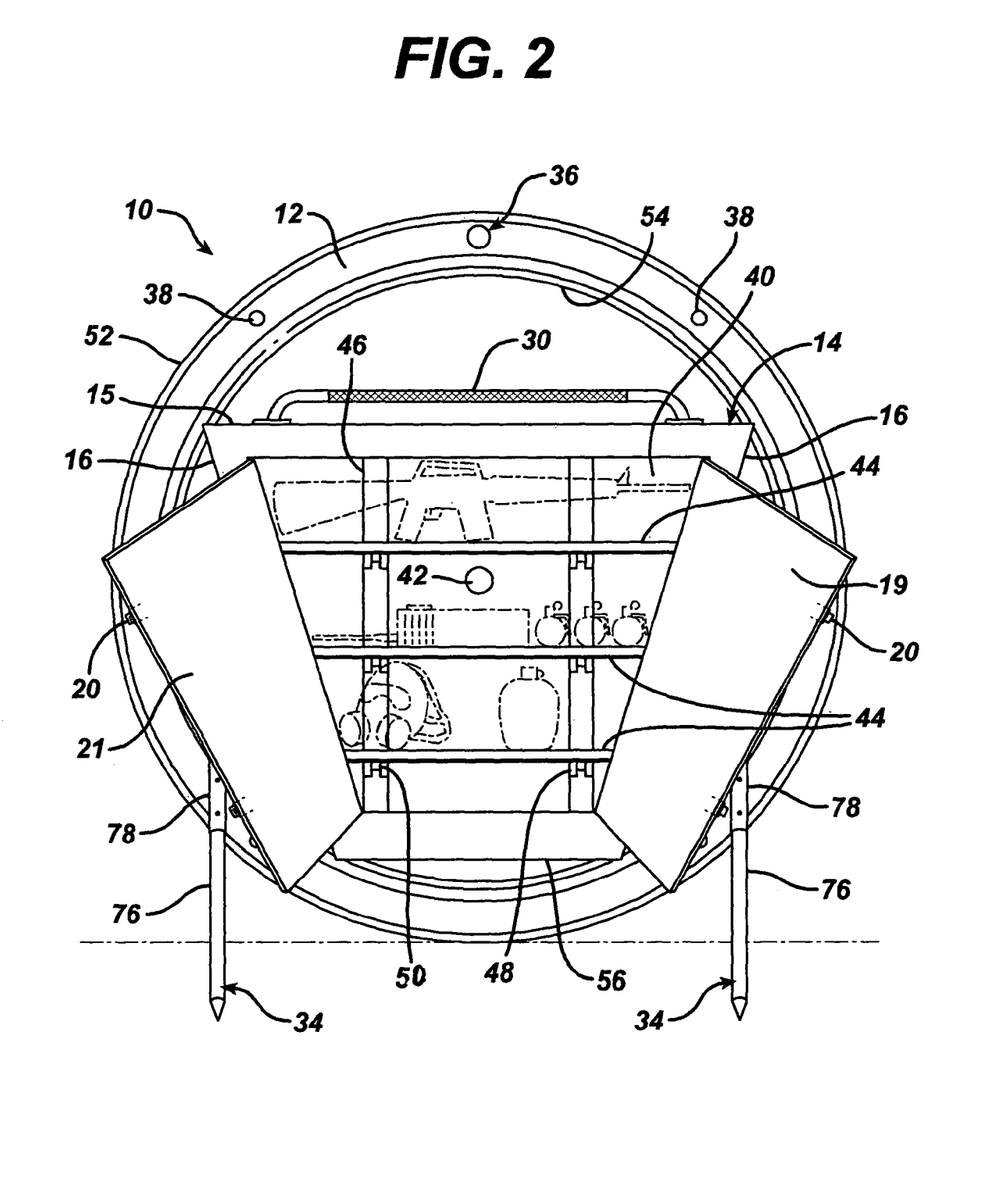
FIG. 2 is a view similar to FIG. 1 with the left and right front door panels shown in open position so as to present a clear view of the interior of the cabinet shaped back-pack.
Figure 3:
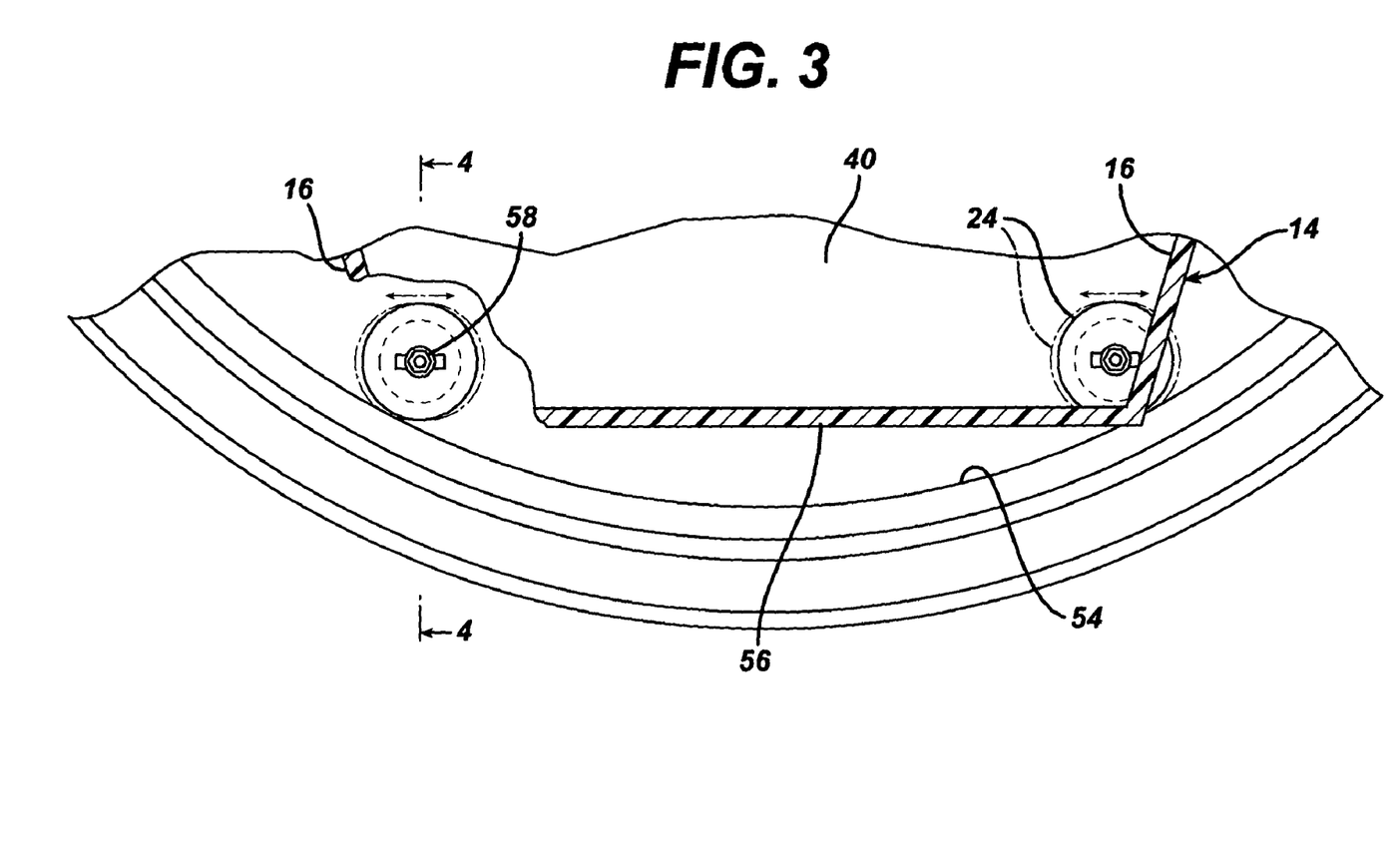
FIG. 3 is a sectional view taken along the lines 3—3 of FIG. 2B of left and right side back-pack mounted guide wheels rotating cooperatively with the disc mounted guide rail.
Figure 5:
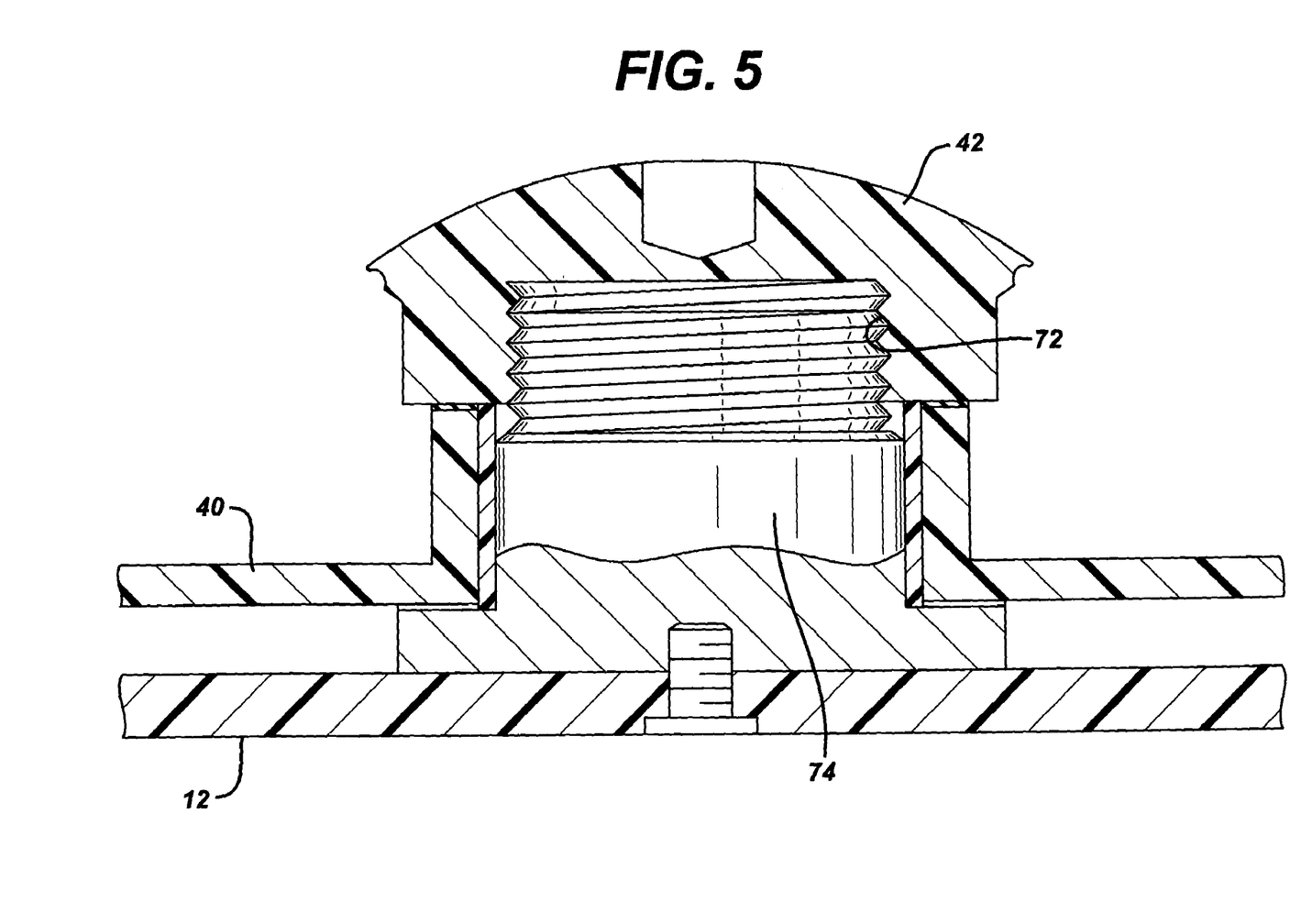
FIG. 5 is a schematic representation of a connecting cap and rotary coupling for securing the rear wall of the back pack and inner wall of the disc together in order to permit disc rotation during back-pack transportation.
Figure 6:
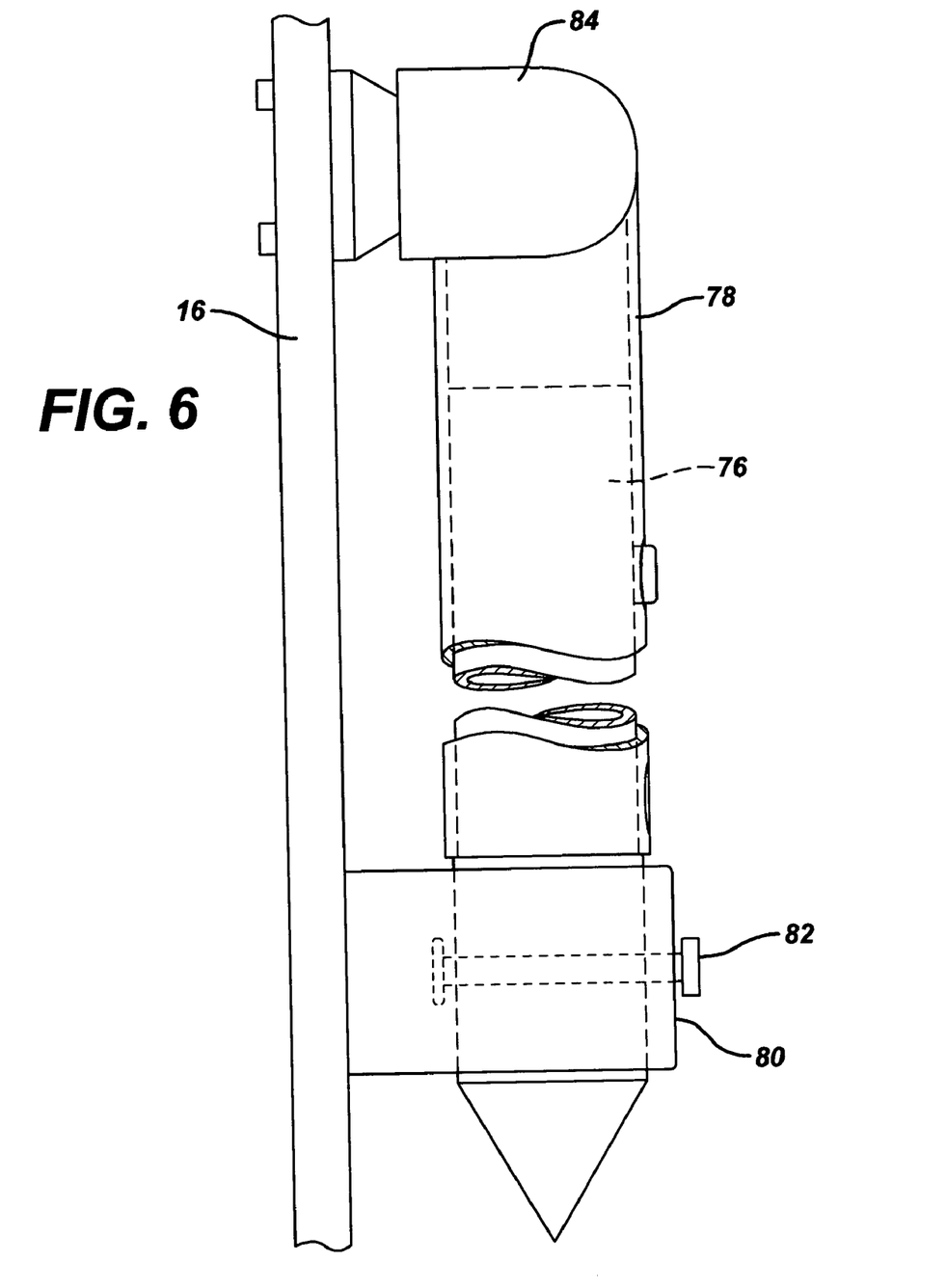
FIG. 6 is a side elevational, perspective view of a stabilizing leg as being secured prior to use at one side of a back-pack.

Turning now to the drawings wherein similar structures having the same function are denoted with the same numerals, in FIG. 1 a version of the mobile back-pack 10 of the present invention is shown. The mobile back-pack 10 is comprised essentially of a back-pack constructed as a container in the form of a cabinet 14 in the shape of a trapezoid, the cabinet 14 being rotatably affixed (FIG. 5) to the disc 12. Dimensions of the disc can be, for example, 54" in diameter by ¼" in thickness, with the cabinet 14 measuring 35" in height, 36" length of top surface, 21" length of bottom surface, and 7" depth between the rear wall and the front panel. The cabinet has flat top 15 and bottom 56 (FIGS. 1 and 3) surfaces connected by substantially flat left and right sides 16, and a flat rear wall 40 (FIG. 2). In FIG. 1 the cabinet front panel 18 is shown closed, secured by center positioned slide latches 20 and left and right side affixed hinges 22. The front panel 18 is split in half (FIG. 2) permitting access to the cabinet interior when required by releasing the slide latches 20 and swinging the left half 21 of the front panel to the left by means of the side mounted hinges 22, and similarly the right half 19 of the front panel to the right. A stud 32 supported handgrip railing 30 is affixed along the length of the cabinet top surface as an aid in propelling or maneuvering the mobile back-pack as may be required. For additional convenience in moving the mobile back-pack four hook projections 35 are provided affixed to a border strip 23 adjacent the front panel 18, their purpose being to enable an operator to attach straps to these projections so as to carry the mobile back-pack in a traditional "back-pack" manner if an extremely steep incline is encountered.

Figure 2A:
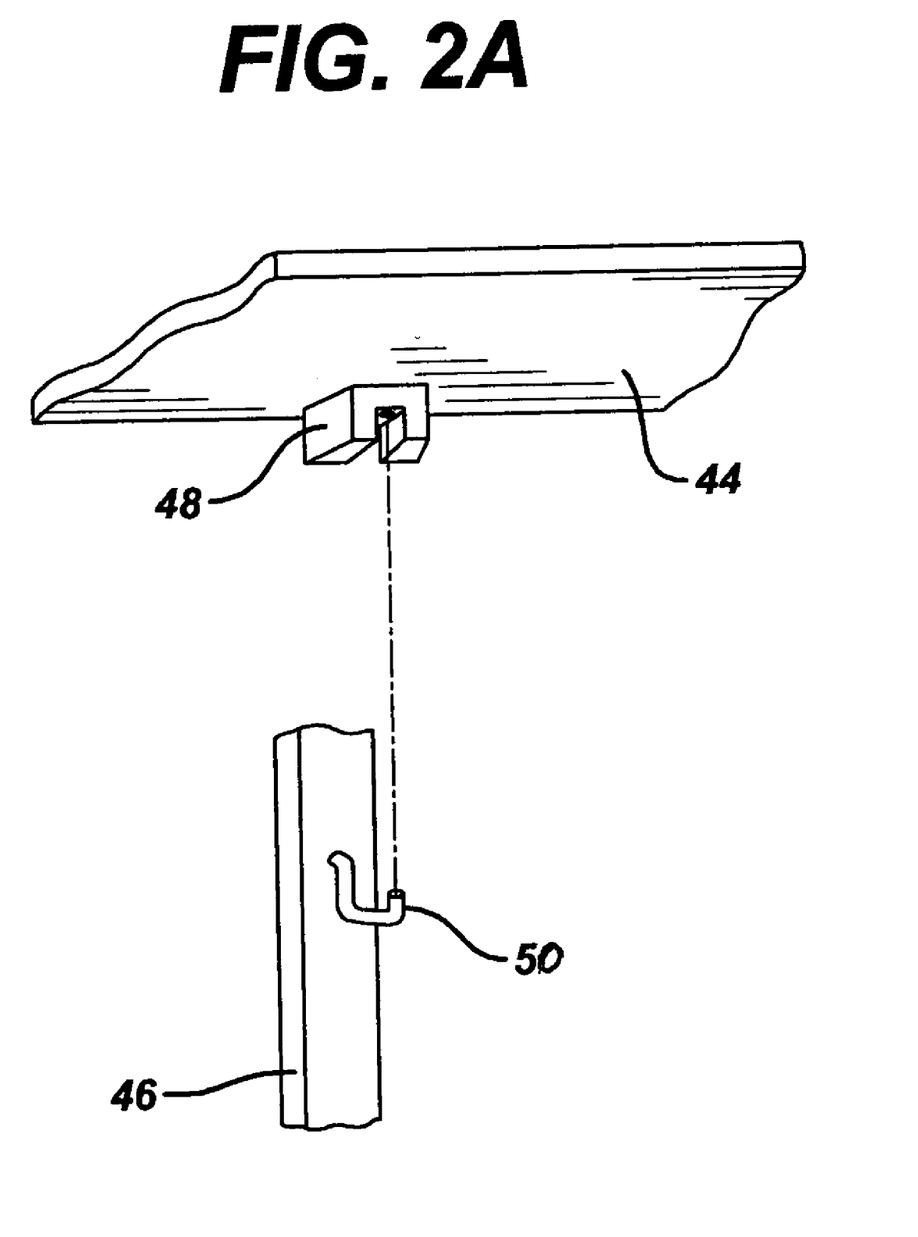
FIG. 2A is a sectional, partially exploded view of a bottom area of one tray as depicted in FIG. 2, illustrating one version of a tray securing mechanism that can be employed within the back-pack.
Figure 2B:
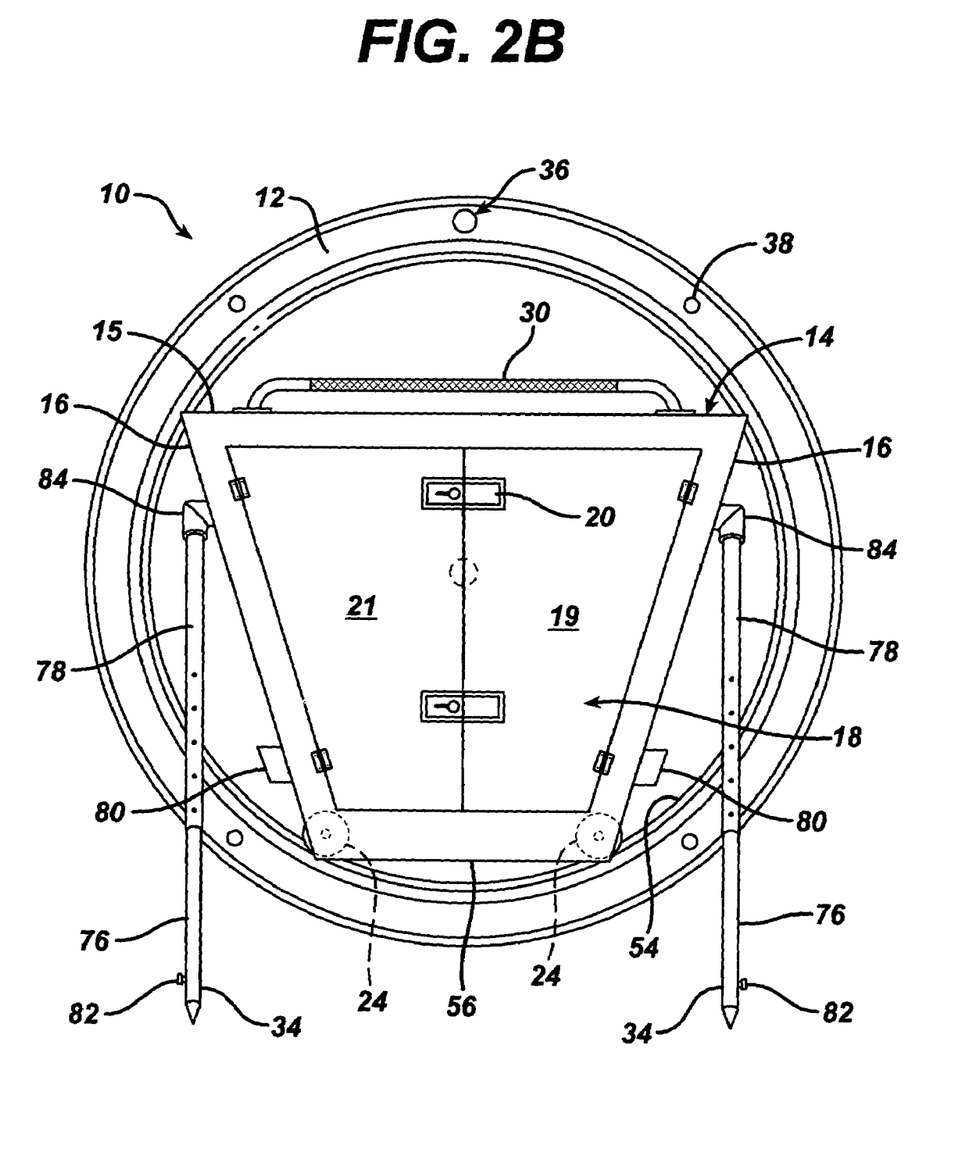
FIG. 2B is a perspective, frontal view similar to that depicted in FIG. 1, of one version of the mobile back-pack of the present invention.
Figure 2C:
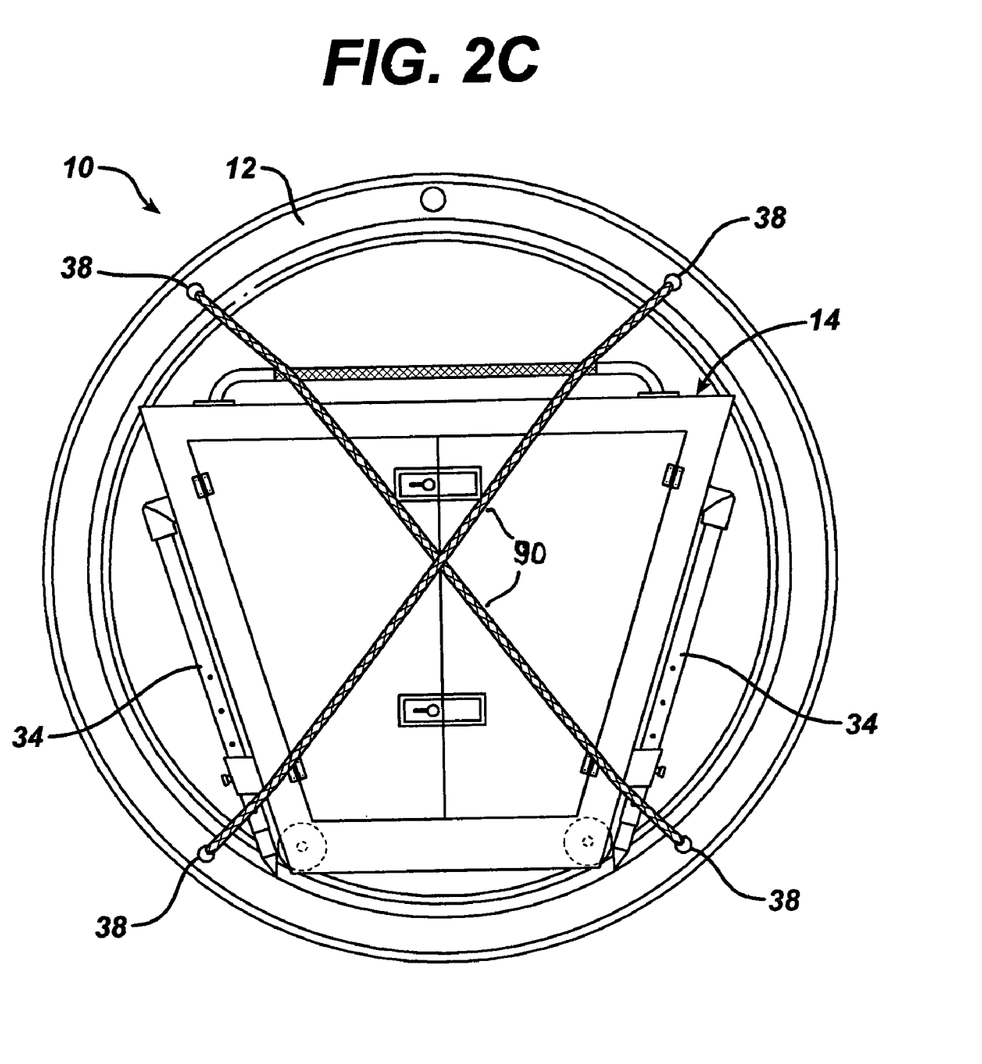
FIG. 2C is a perspective view of one version of the mobile back-pack similar to that depicted in FIGS. 1 and 2B, illustrating the use of ropes to secure the mobile back-pack during transportation, and the support legs being secured to the left and right sides of the back-pack.

FIG. 2 is a view of the mobile back-pack 10 similar to FIG. 1 with the front panel 18 shown in open position so as to clearly depict the interior of the cabinet 14. Two tray guides strips 46 affixed to the rear wall of the cabinet. Three trays 44 are provided for securing items to be transported. As best seen in FIG. 2A, the trays are secured by tray hooks 50 affixed to the tray guide strips 46 acting in cooperation with the tray hook couplings 48 affixed to the bottom surface of the trays 44. In this manner items secured within the cabinet are made quickly available to the operator when required by simply lifting the tray 44 up above the tray hooks 50. Obviously other methods of tray removal, including slide out trays, may be employed according to designer preference.

A rotary coupling (FIGS. 2 and 5) connects the center of the disc 12 to a midsection of the rear wall 40 of the cabinet. A male section of the coupling 74 is affixed to an inner surface of the disc at the approximate center of the disc for rotation within a female section of the coupling 72 affixed to an inner surface of the cabinet 14 rear wall 40. A connecting cap 42 (FIGS. 2 and 5) secures the rotary coupling (72, 74) together. To further insure smooth rotation of the disc while maintaining the cabinet in position relative to the cabinet a pair of guide wheels 24 (FIGS. 1, 3, and 4) are affixed at opposite inner corners of the cabinet base 56. The guide wheels 24 are secured by a cap 58 (FIG. 4) to a rotary coupling 60 affixed to left and right cabinet side walls 16 immediately adjacent the base 56 of the cabinet. An enclosure 62 within the cabinet serves as a protection for the rotary coupling. The guide wheels 24 then glide on a guide rail 54 extending laterally from an inner surface adjacent the periphery of the disc. In this manner the cabinet is easily maintained in an upright, operable position as it is transported via the disc being propelled by an operator.

To provide stability when the mobile back-pack is in an upright, stationary position a pair of support legs 34 is built-in (FIGS. 1, 2B, 2C, 6, and 8). Each support leg is comprised of two tubes (76, 78) telescoped together. When not is use the support legs are secured at the right and left sides 16 of the cabinet by means of a pivotable connector 84 at a top section of each support leg, and an encircling retainer 80 and wing nut 82 at a base section of each support leg. When needed as, for example, by a soldier in the field (FIG. 8), the support legs 34 are simply released from the base retainers 80 and extended outwards and downwards to contact the ground.

Figure 4:
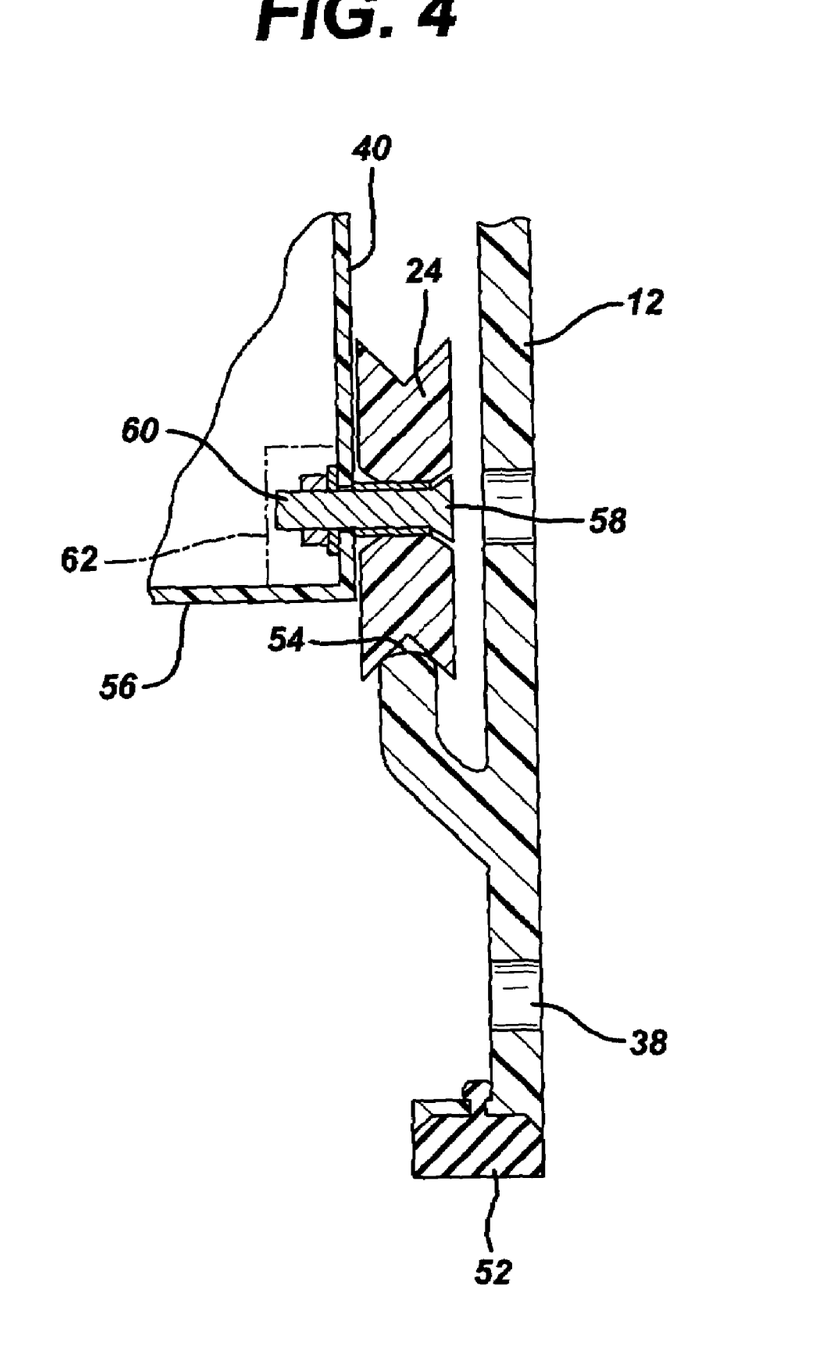
FIG. 4 is a sectional view taken along the lines 4—4 of FIG. 3 of the cooperative disc guide rail and back-pack mounted guide wheel assembly for permitting rotation of the disc and simultaneous back-pack transportation.
Figure 7:
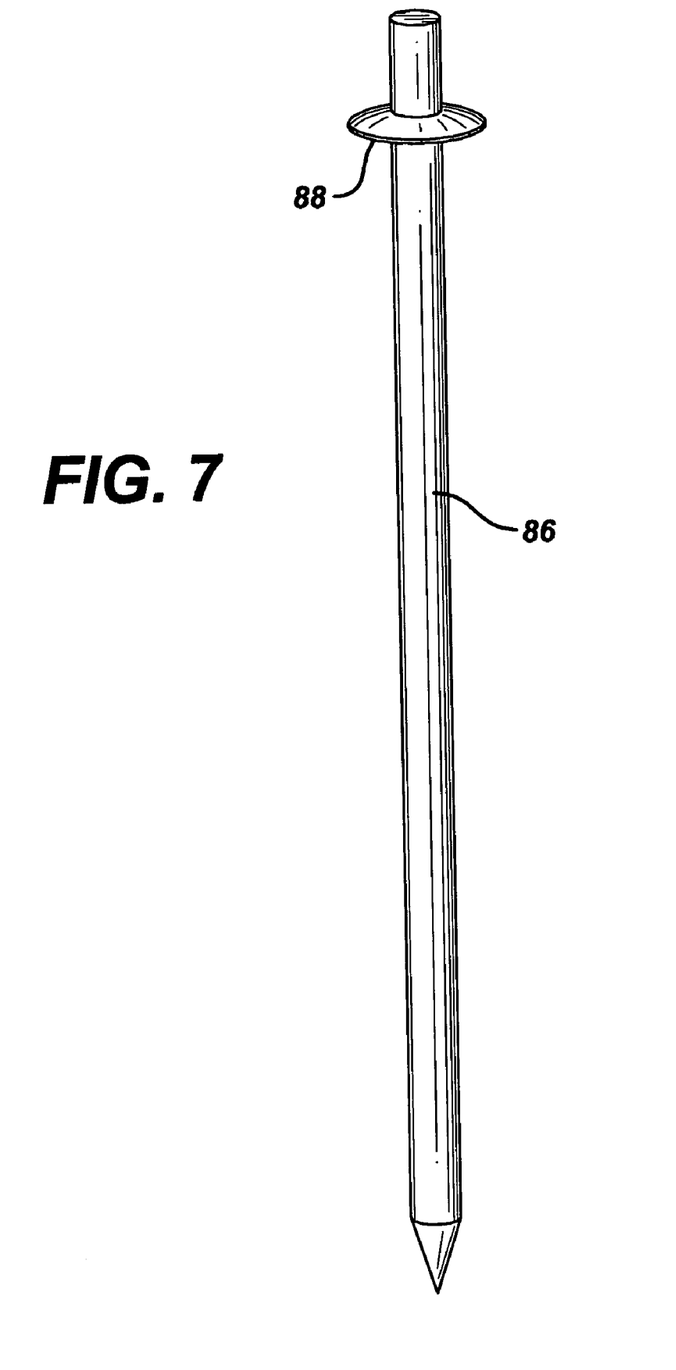
FIG. 7 is a top plan, perspective view of a peg fabricated for insertion in peripheral disc holes so as to provide a temporary shelter for an operator using the mobile back-pack of the present invention.
Figure 8:
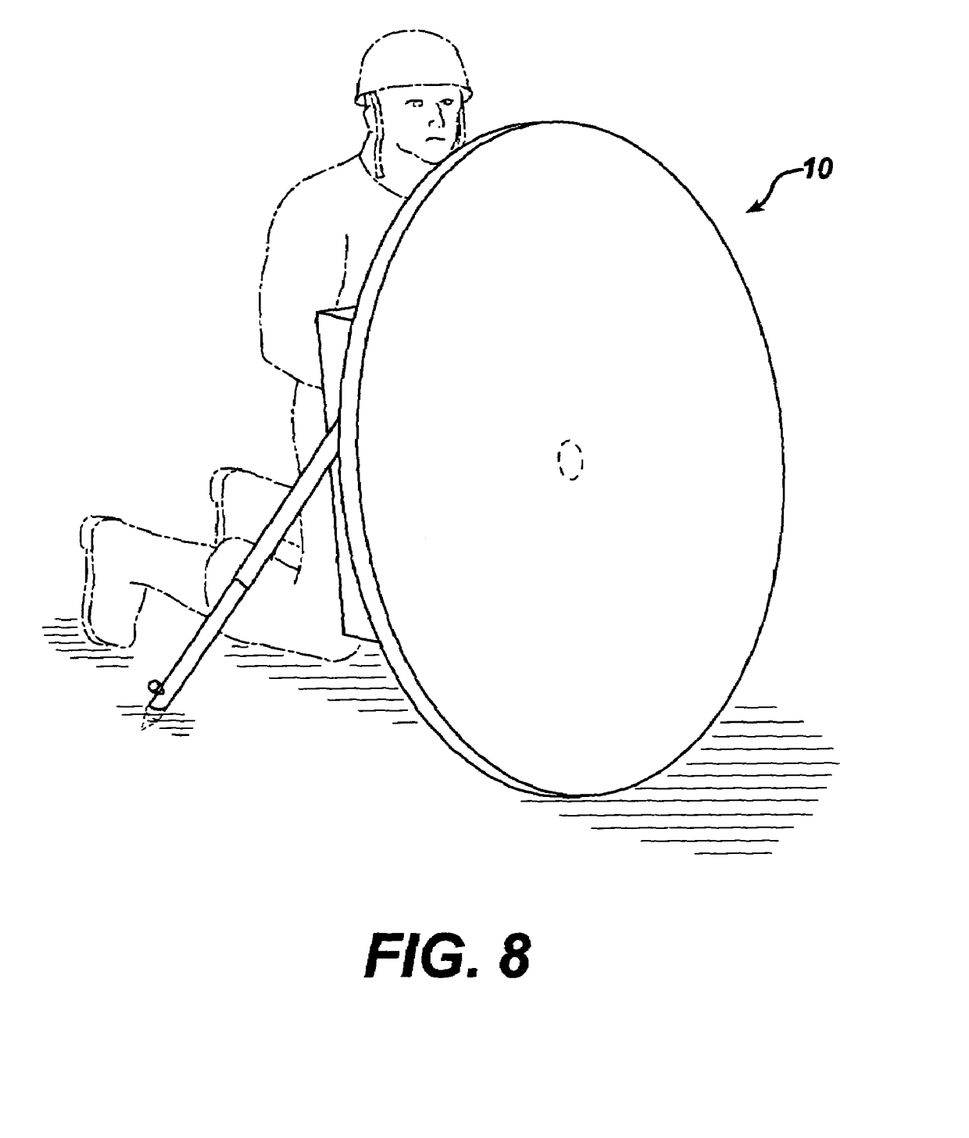
FIG. 8 is a perspective view of a soldier making use of one version of the mobile back-pack.
Figure 9:
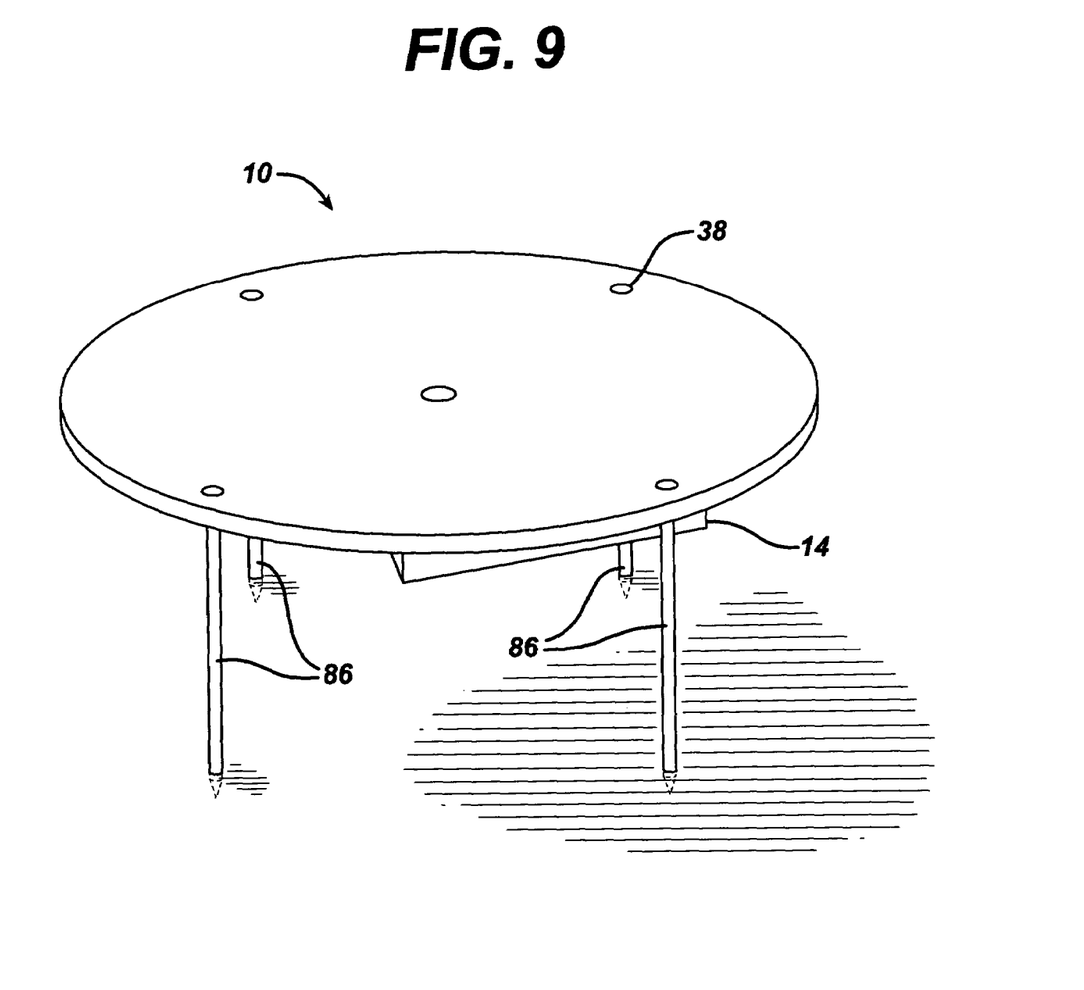
FIG. 9 is a top plan perspective view illustrating the use of pegs to create a temporary shelter in cooperation with one version of the mobile back-pack.

As seen in FIG. 4 the disc has a solid elastomeric band 52 around its entire circumference. Holes 38 in the periphery of the disc, in addition to securing ropes 90 (FIG. 2C) for use in transporting the mobile back-pack, can be used in conjunction with pegs 86 (FIG. 7) in order to create a temporary shelter (FIG. 9). The pegs can be inserted into the four holes 38 provided up to the built-in peg stops 88. A rifle sight opening 36 can also be provided at a peripheral edge of the disc. Other unique military type applications for the mobile back-pack include using duct tape to render the interior of the cabinet water proof when it may be necessary to ford a stream.

Figure 10:
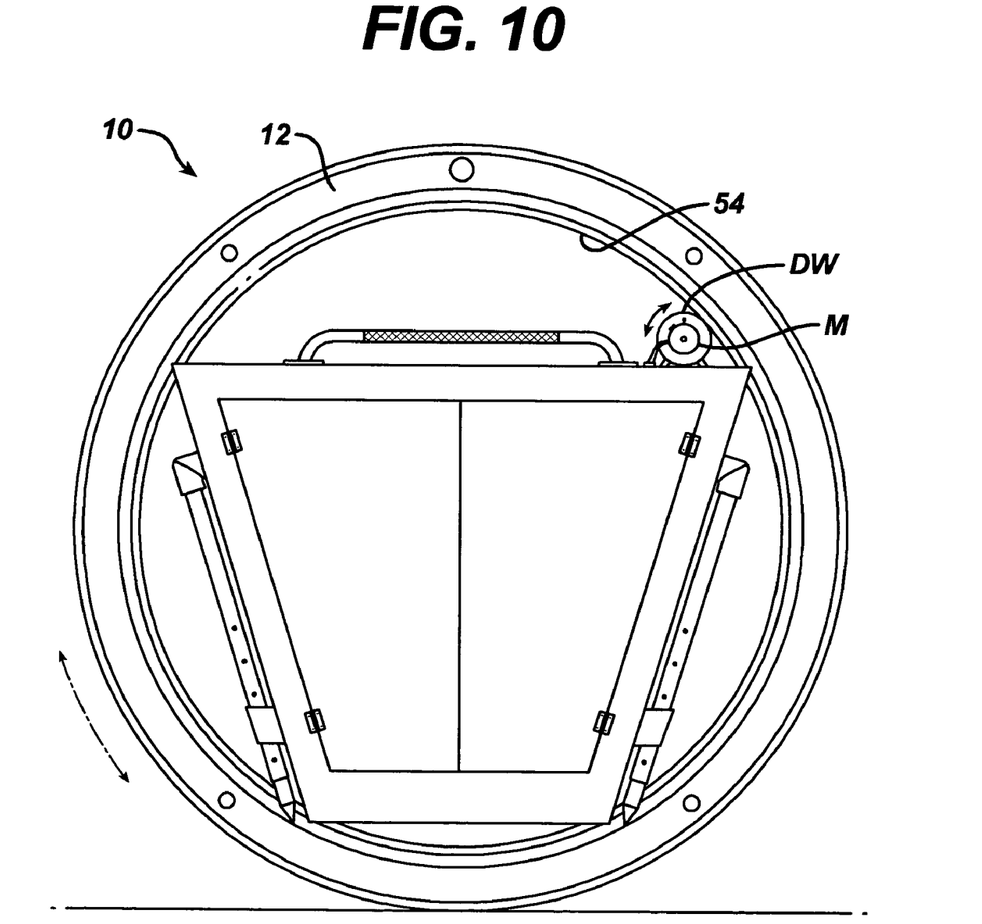
FIG. 10 is a perspective view similar to that of FIGS. 1, 2B, and 2C illustrating the use of a battery powered motor for propelling one version of the mobile back-pack.
Figure 11:
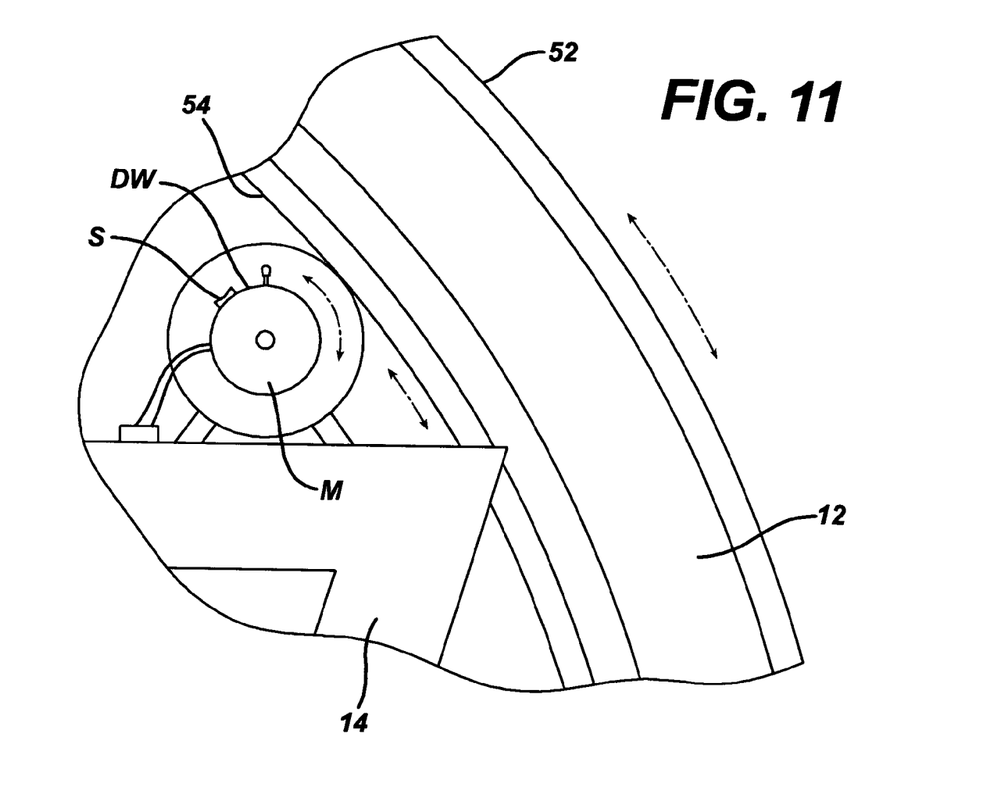
FIG. 11 is a schematic, sectional representation of a battery powered motor and drive wheel for propelling the mobile back-pack in either a forward or backward motion.
Figure 12:
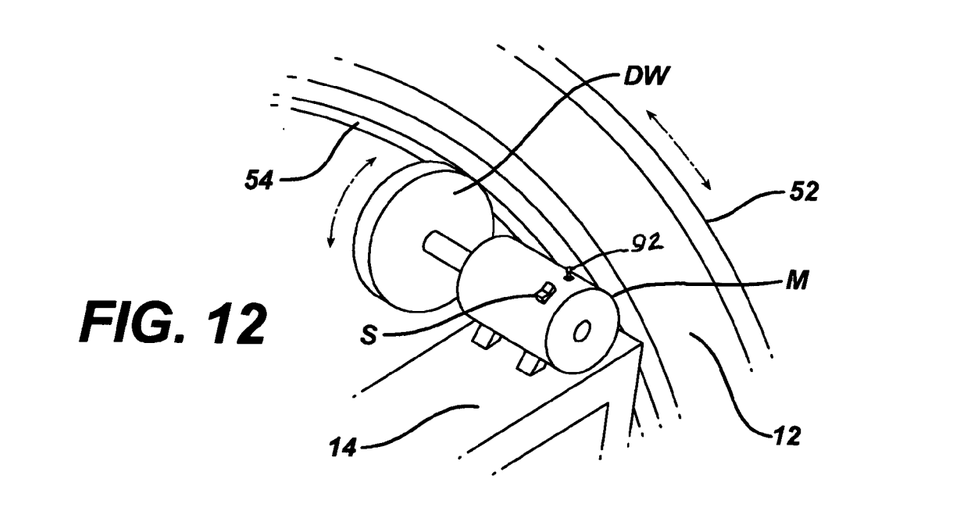
FIG. 12 is a view similar to that depicted in FIG. 11, illustrating a battery powered motor as mounted on a top surface of the back-pack, with on/off switch and operator control for propelling the disc and back-pack in forward of backward direction.

FIGS. 10, 11, and 12 illustrate the addition of a battery powered motor M and drive wheel DW to the above described version of the mobile back-pack 10 of the invention. The motor M can be mounted, for example, towards one end of the top surface 15 of the cabinet 14, with the drive wheel DW positioned adjacent the guide rail 54. In this version an operator simply turns the motor on using the on/off switch 92. The operator can then activate the directional switch S for propelling the mobile back-pack either in a forward or backward direction, and then, grasping the handgrip railing 30, direct the mobile back-pack in the desired direction. The motor and drive wheel assembly are conventional, and well known to the art. The drive wheel can be of the friction drive type with a friction outer surface contacting the outer surface of the guide rail 54 in order to propel the disc forward or backward. Or the drive wheel can be of the gear type with teeth (not shown) matching teeth (not shown) on the guide rail 54. In this latter case the guide wheels 24 at the base of the cabinet would similarly also have matching teeth (not shown).

While the present invention has been disclosed in connection with versions shown in detail, various modifications and improvements will become readily apparent to those skilled in the art. For example, instead of using duct tape or the like to seal the front panels, water seals, such as rubber gaskets, can be affixed to the panels to achieve the weatherproofing effect. Also a back panel can be affixed to the top surface of top 15, extending substantially across this surface. This acts as a safety guard to protect the user's fingers. Accordingly, the spirit and scope of the present invention is to be limited only by the following claims.

What is claimed is:

1. A mobile back-pack for use by an operator, comprising:
    (a) a container;
    (b) said container having a top surface, a bottom surface, a rear wall, a front wall, a left side extending between said top surface and said bottom surface, and a right side extending between said top surface and said bottom surface, said surfaces, walls and sides forming an enclosed volume within said container, said container further including in said enclosed volume, means for organizing any items placed within said enclosure, said front walls of said container having means for opening said front wall so that when said front wall opening means is activated by said operator said means for organizing is accessible to said operator;
    (c) a disc, said disc being of sufficient diameter so as to be able to entirely enclose said rear wall of said container within an inner surface area of said disc;
    (d) means for rotatably connecting said container to said disc, so that when said rotary connecting means is activated, said disc can be placed in an upright position by an operator, said disc being of sufficient height in said upright position in relation to said operator so as to permit said operator to grasp said container and then propel said container now supported by said disc at a side of said operator in any direction selected by said operator;
    (e) at least one handgrip being affixed to said top surface of said cabinet;
    (f) at least one guide wheel being affixed to a peripheral portion of said container;
    (g) a guide rail, said guide rail being affixed to and extending a spaced distance from a peripheral edge of said disc and along the full circumference of said disc, said guide wheel being positioned so as to make contact with, and glide on, said guide rail; and
    (h) a battery powered motor and attached drive wheel, said battery powered motor having operator controlled means for being turned on and off, and operator controlled means for said drive wheel being directed to rotate either clockwise or counterclockwise upon direction of said operator, said battery powered motor and said drive wheel being affixed to and positioned on said container so that an outer surface of said drive wheel contacts an outer surface of said guide rail, so that when said operator activates said means for turning on said battery powered motor, and said operator activates said drive wheel rotation means, said container and said disc are caused to be propelled by said motor and said drive wheel in any direction selected by said operator.

2. The mobile back-pack according to claim 1 wherein said means for rotatably connecting said container to said disc comprises a removable cap secured rotary coupling affixed to said rear wall of said container, and a cooperating rotary coupling affixed to an inner wall of said disc.

3. The mobile back-pack according to claim 1, further comprising a handgrip railing affixed to, and extending substantially the length of, said top surface of said container.

4. The mobile back-pack according to claim 1, further comprising a pair of support legs, a first one of said pair of support legs being releasably secured to said left side of said container, the second one of said pair of support legs being releasably secured to said right side of said container, said first and second support legs being comprised of at least two tubes telescoped together, so that when said first and second support legs are released from said sides of said container said support legs can be extended outwards and downwards from said sides and said top surface of said container until a ground surface is contacted, thereby providing stability for said disc and said container when said operator wishes to position said disc and said container in an upright, stationary position.

5. The mobile back-pack according to claim 1, further comprising at least one tray within an interior portion of said container, said tray being positioned between said left and right sides of said container in a substantially parallel position relative to said top surface and said bottom surface of said container.

6. The mobile back-pack according to claim 1 wherein said disc contains at least four apertures adjacent peripheral edges of said disc, said four apertures being spaced approximately 90° apart from one another.

7. The mobile back-pack according to claim 1, further comprising at least four hook projections being affixed to top and bottom border strips on said front wall of said container, said four hook projections enabling said operator to connect straps to said hook projections, thereby enabling said operator to transport said disc and said container on the back of said operator.

8. The mobile back-pack according to claim 1, further comprising a pair of support legs, a first one of said pair of support legs being releasably secured to said left side of said container, a second one of said pair of support legs being releasably secured to said right side of said container, each of said first and second support legs being comprised of at least two tubes telescoped together, so that when said first and second support legs are released from said sides of said container said support legs can be extended outwards and downwards from said sides and said top surface of said container until a ground surface is contacted, thereby providing stability for said disc and said container when said operator wishes to position said disc and said container in an upright, stationary position.

9. The mobile back-pack according to claim 1, further comprising at least one tray within an interior portion of said container, said tray being positioned between said left and right sides of said container in a substantially parallel position relative to said top surface and said bottom surface of said container, said front walls of said container having means for opening said front wall so that when said front wall opening means is activated by said operator said tray is accessible to said operator.

10. The mobile back-pack according to claim 1 wherein said disc contains at least four apertures adjacent peripheral edges of said disc, said four apertures being spaced approximately 90° apart from one another.

11. The mobile back-pack according to claim 1, further comprising at least four hook projections being affixed to top and bottom border strips on said front wall of said container, said four hook projections enabling said operator to connect straps to said hook projections, thereby enabling said operator to transport said disc and said container on the back of said operator.

12. The mobile back-pack according to claim 6, further comprising at least four pegs for insertion within said at least four apertures within said disc at one end of each of said pegs, with the other end of each of said pegs being inserted into a ground area, thereby raising said disc and said container a spaced distance above said ground.

13. The mobile back-pack according to claim 10, further comprising at least four pegs for insertion within said at least four apertures within said disc at one end of each of said pegs, with the other end of each of said pegs being inserted into a ground area, thereby raising said disc and said container a spaced distance above said ground.

14. A method for transporting a back-pack at the side of an operator, comprising the steps of:
  (a) forming a disc;
  (b) rotatably connecting a rear wall of said back-pack to a center area of said disc, said rear wall of said back-pack being completely enclosed within the circumference of said disc;
  (c) affixing a handgrip to a top surface of said back-pack;
  (d) affixing a guide rail adjacent the circumference of said disc;
  (e) affixing a pair of guide wheels at opposite corners of a base portion of said back-pack;
  (f) connecting said guide wheels to said guide rail;
  (g) affixing a battery powered motor and attached drive wheel to said back-pack;
  (h) positioning said drive wheel so that an outer surface of said drive wheel contacts an outer surface of said guide rail;
  (i) moving said disc and said back-pack into an upright position; and
  (j) having said operator grasp said handgrip and activate said battery powered motor, said operator then directing said drive wheel to rotate either clockwise or counterclockwise, thereby causing said back-pack to be propelled in a direction dictated by said operator.

15. The method according to claim 14, further comprising the step of affixing a pair of support legs to said back-pack, said support legs being latch secured to left and right sides of said back-pack prior to use, said support legs extending outward and downward from said top surface of said sides of said back-pack in use, said support legs providing stability for said disc and said back-pack by contacting a ground surface adjacent said disc.

16. The method according to claim 14, further comprising the steps of:
  (a) having one or more trays placed within said back-pack, said trays being positioned between a left and a right side of said back-pack and substantially parallel to said top surface and a bottom surface of said back-pack; and
  (b) having said operator open a front wall on said back-pack, thereby accessing said tray(s) at any time convenient to said operator.

* * * * *